(12) United States Patent
Eyerman et al.

(10) Patent No.: US 8,812,808 B2
(45) Date of Patent: Aug. 19, 2014

(54) COUNTER ARCHITECTURE FOR ONLINE DVFS PROFITABILITY ESTIMATION

(75) Inventors: Stijn Eyerman, Evergem (BE); Lieven Eeckhout, Evergem (BE)

(73) Assignee: Universiteit Gent, Ghent (BE)

( * ) Notice: Subject to any disclaimer, the term of this patent is extended or adjusted under 35 U.S.C. 154(b) by 234 days.

(21) Appl. No.: 13/516,850

(22) PCT Filed: Dec. 10, 2010

(86) PCT No.: PCT/EP2010/069419
§ 371 (c)(1),
(2), (4) Date: Jun. 18, 2012

(87) PCT Pub. No.: WO2011/073109
PCT Pub. Date: Jun. 23, 2011

(65) Prior Publication Data
US 2012/0260057 A1    Oct. 11, 2012

Related U.S. Application Data

(60) Provisional application No. 61/287,835, filed on Dec. 18, 2009.

(30) Foreign Application Priority Data

May 26, 2010   (GB) .................................. 1008785.6

(51) Int. Cl.
*G06F 12/00*   (2006.01)
(52) U.S. Cl.
USPC ............................ 711/167; 711/118; 711/123
(58) Field of Classification Search
None
See application file for complete search history.

(56) References Cited

U.S. PATENT DOCUMENTS

| | | | |
|---|---|---|---|
| 6,378,081 | B1 | 4/2002 | Hammond |
| 2001/0011356 | A1 | 8/2001 | Lee et al. |
| 2007/0168055 | A1 | 7/2007 | Hsu et al. |
| 2008/0201591 | A1* | 8/2008 | Hu et al. ....................... 713/323 |

FOREIGN PATENT DOCUMENTS

| | | |
|---|---|---|
| GB | 2406184 A | 3/2005 |
| GB | 2459968 A | 11/2009 |
| WO | 2007056705 A2 | 5/2007 |

OTHER PUBLICATIONS

International Search Report for PCT/EP2010/069419, dated Apr. 27, 2011.
McGowen, R., et al., "Power and Temperature Control on a 90-nm Itanium Family Processor", IEEE Journal of Solid-State Circuits, vol. 41, No. 1, Jan. 2006, pp. 229-237.
Sherwood, T., "Automatically Characterizing Large Scale Program Behavior", ASPLOS X, Oct. 2002, pp. 45-57.

* cited by examiner

*Primary Examiner* — Shawn X Gu
(74) *Attorney, Agent, or Firm* — Bacon & Thomas, PLLC

(57) ABSTRACT

A counter architecture and a corresponding method are provided for estimating a profitability value of DVFS for a unit of work running on a computing device. The counter architecture and the corresponding method are arranged for dividing total execution time for executing a unit of work on the computing device into a pipelined fraction subject to clock frequency and a non-pipelined fraction due to off-chip memory accesses, and for estimating the DVFS profitability value from the pipelined and the non-pipelined fraction.

13 Claims, 10 Drawing Sheets

COUNTER ARCHITECTURE FOR ONLINE DVFS PROFITABILITY ESTIMATION

CROSS-REFERENCE TO RELATED APPLICATIONS

This application claims the benefit of U.S. provisional application 61/287,835 filed Dec. 18, 2009, which is incorporated herein by reference.

FIELD OF THE INVENTION

The present invention relates to counter hardware and software. More particularly, the present invention relates to a hardware counter architecture to accurately estimate profitability of Dynamic Voltage and Frequency Scaling (DVFS) in a computing device, and to an implementation in a simulator (e.g. in software) to estimate performance and energy consumption at different clock frequencies and voltage levels from a single simulation run.

BACKGROUND OF THE INVENTION

Energy and power consumption are first-class design concerns for contemporary computing devices, from low-end embedded systems to high-end high-performance microprocessors. For embedded devices, the focus is on low energy consumption to increase battery time. For high-performance microprocessors, the goal is to maximize system performance within a given power budget.

Dynamic Voltage and Frequency Scaling (DVFS) is a well-known and effective technique for reducing power consumption and/or increasing performance in modern computing devices.

Dynamic voltage scaling is a power management technique where the supply voltage used by a computing device (for example by the central processing unit of a computer system, the main memory controller of a computer system, the central processing unit of a router or the central processing unit of a server system) is increased or decreased, depending upon circumstances. Decreasing the supply voltage may be done in order to conserve power, particularly for example in laptops and other mobile devices, where energy comes from a battery and thus is limited. Increasing the supply voltage may be done in order to allow an increase of frequency, thus increasing computing device performance, or to increase reliability.

Dynamic frequency scaling is another power conservation technique that works on the same principles as dynamic voltage scaling. It is a technique whereby the frequency of a computing device, for example the processor clock frequency or the memory controller clock frequency, can be automatically adjusted on-the-fly, either to conserve power and reduce the amount of heat generated by the computing device, or to increase performance. Dynamic frequency scaling is also commonly used in laptops and other mobile devices, where energy comes from a battery and thus is limited. Dynamic frequency downscaling reduces the number of instructions a computing device can execute in a given amount of time, thus reducing performance. Hence, it is generally used when the workload is not computing intensive. Dynamic frequency upscaling improves performance, and is often implemented in commercial high-end processors to improve performance within a maximum power budget.

DVFS lowers the supply voltage as well as the clock frequency of the computing device to reduce both dynamic and static power consumption. Because downscaling both voltage and frequency leads to a cubic reduction in dynamic power consumption (and at most linear reduction in performance), frequency and voltage are often downscaled simultaneously. DVFS is being used in commercial computing devices across the entire computing range. Both dynamic voltage scaling and dynamic frequency scaling of the computing device can be used to prevent computer system overheating, that can result in program or operating system crashes, and possibly hardware damage. Reducing the voltage supplied to the computing device below the manufacturer's recommended minimum setting can result in system instability. Hence there is a need to determine DVFS impact on computing device performance and energy consumption. The applicability of DVFS is not limited to reducing power and energy consumption. It is also effective at addressing timing errors due to process variability. Other applications of DVFS include amongst others lifetime reliability management (where a trade-off is made between supply voltage and/or frequency on the one hand, and lifetime reliability on the other hand), and dynamic thermal management (where a trade-off is made between supply voltage and/or frequency on the one hand, and local heating in the processor on the other hand).

An important delimiter to DVFS is that there exists no accurate and practical way for estimating its impact on performance and energy consumption. Existing DVFS profitability estimation approaches can be categorized in three classes:

One approach for estimating the performance and energy impact of DVFS is proportional scaling, i.e., performance is assumed to scale proportionally with clock frequency, and power consumption is assumed to scale quadratically with supply voltage and linearly with frequency. Proportional scaling may be accurate for compute-bound applications, but incurs (severe) errors for memory-bound applications because off-chip memory access latencies do not scale with computing device clock frequency.

Linear scaling states that performance is a linear function of clock frequency. The slope of this linear function depends on the application behavior. If the application is compute-bound, the slope will be proportional to clock frequency. If on the other hand, the application is memory-bound, the slope is (almost) flat, i.e., performance is barely affected by processor clock frequency. Although linear scaling yields accurate DVFS performance estimates for both compute-bound and memory-bound applications, it introduces runtime performance and/or energy overhead because it requires (at least) two samples at different V/f operating points for computing the linear slope.

Estimated linear scaling eliminates the runtime overhead in linear scaling by estimating the relationship between performance and clock frequency. Estimated linear scaling uses existing hardware performance counters to count the number of off-chip memory accesses, and derives an empirical model to estimate the linear slope as a function of the number of off-chip memory accesses. By counting the number of off-chip memory accesses, estimated linear scaling does not account for the impact of MLP (memory-level parallelism or multiple memory accesses overlapping in time) on the non-pipelined fraction of the execution time, since the method systematically overestimates the non-pipelined fraction by treating multiple time-overlapping off-chip memory accesses as individual time-separated memory accesses. Therefore, estimated linear scaling leads to inaccurate DVFS profitability estimates. A number of hardware performance monitors are known. Hardware performance monitoring is implemented in commercial computing devices. Improvements on existing performance monitors are proposed, for example to have one monitor count conditionally on another monitor overflowing, or to compute histograms using performance monitors. No hardware performance monitors exist which are specifically tied to DVFS.

US 2008/0201591 describes a system that uses DVFS in a run-time environment to reduce energy consumption while minimizing the effect on performance for multi-threaded applications. The technique uses (existing) hardware performance counters to count the number of execution cycles, number of retired micro-operations, and the number of stall cycles due to cache misses, page faults (TLB misses), full reorder buffer (ROB), full reservation station, or branch misprediction. At the end of a pre-configured fixed time interval, the counters are read and the system determines whether or not to scale to another V/f operating point.

US 2007/0168055 describes a system that dynamically adapts voltage and clock frequency to increase energy-efficiency. It does so by running the application at multiple clock frequencies to derive the performance sensitivity to frequency scaling (much like the linear scaling approach described above).

There is still a need for methods and devices that more accurately estimate profitability of Dynamic Voltage and Frequency Scaling (DVFS) in a computing device.

SUMMARY OF THE INVENTION

It is an object of embodiments of the present invention to provide methods and devices for accurately estimating a profitability value for Dynamic Voltage and Frequency Scaling (DVFS) in a computing device. The profitability value may for example be expressed in terms of speedup of execution time and/or energy saving.

The above objective is accomplished by a method and device according to the present invention.

A technical problem solved in the present invention is how to accurately determine the pipelined and non-pipelined fractions of the total execution time online in hardware while executing a unit of work on a computing device, such as for example, but not limited thereto, a processor, a memory controller, a router. The pipelined fraction and the non-pipelined fraction are defined as the fraction of the total execution time that changes and does not change when changing computing device clock frequency, respectively. The total execution time is the total elapsed time to execute a unit of work, e.g. a computer program, a transaction, a number of transactions, an application, etc. The key idea of a counter architecture according to embodiments of the present invention is to determine the pipelined and non-pipelined fractions of the total execution time by observing the time spent in handling off-chip memory accesses. Contrary to prior art methods such as estimated linear scaling where the non-pipelined fraction is determined by counting the number of off-chip memory accesses (hence a number of events taking place), a counter architecture according to embodiments of the present invention provides a direct time estimate of the non-pipelined fraction of the total execution time, for example by counting the number of cycles spent handling off-chip memory accesses and dividing this number by the clock frequency of the computing device. It is an advantage of embodiments according to the present invention that a counter architecture is provided which takes into account MLP, so that even in the case of multiple off-chip memory accesses overlapping in time an accurate and reliable DVFS profitability value is obtained.

Memory accesses are defined broadly here: in the case of the computing device being the processor of a computer system, a memory access includes a load from memory, a store to memory, a TLB (Translation Lookaside Buffer) miss resulting in memory accesses, I/O operations (input/output: both memory-mapped I/O as well as port-mapped I/O). In the case of the computing device being the memory controller of a computer system, off-chip memory accesses include for example the timing of memory operations. In the case of the computing device being a router, memory accesses may for example include network I/O operations, consultations of routing tables in the off-chip memory, etc. Knowing the pipelined and non-pipelined fractions enables accurate execution time and energy estimates under DVFS. The counter architecture according to embodiments of the present invention either counts the pipelined fraction, and then computes the non-pipelined fraction by subtracting the pipelined fraction from the total execution time; alternatively, the counter architecture counts the non-pipelined fraction and then computes the pipelined fraction by subtracting the non-pipelined fraction from the total execution time. A counter architecture according to embodiments of the present invention is arranged for estimating a DVFS profitability value from the pipelined and non-pipelined fractions; i.e. a value which indicates whether it is profitable to downscale frequency with respect to an arbitrarily selected frequency value, also called nominal frequency hereinafter.

According to an inventive aspect of the present invention, a counter architecture is provided for estimating a profitability value of DVFS for a unit of work executed on a computing device, the counter architecture comprising:
  a computing unit for determining from a total execution time (e.g. expressed in number of cycles spent) for executing a unit of work on the computing device at arbitrary computing device clock frequency a pipelined fraction and a non-pipelined fraction due to off-chip memory accesses, and
  a decision unit for determining a DVFS profitability value from these two fractions. The counter architecture may be arranged for providing an estimate for the execution time if operated at a different (scaled, e.g. downscaled) computing device clock frequency f and/or supply voltage V (different from the arbitrarily selected nominal computing device frequency $f_n$ and/or nominal supply voltage $V_n$). The execution time T(f) at frequency f can be estimated as follows:

$$T(f) = T_{non\text{-}pipelined} + \frac{T_{pipelined}(f_n)}{f/f_n}$$

with $f_n$ the nominal computing device clock frequency, $T_{non\text{-}pipelined}$ the non-pipelined fraction and $T_{pipelined}(f_n)$ the pipelined fraction measured at frequency $f_n$. Knowing an estimate for the execution time at a scaled computing device frequency f provides an idea of the profitability of applying DVFS at that scaled frequency f rather than applying it at a nominal frequency $f_n$.

The profitability value may include the speedup of the execution of the unit of work executed on the computing device. The speedup through DVFS is defined as the execution time at the nominal computing device clock frequency $f_n$ (e.g., the processor's current but arbitrarily selected clock frequency, the memory controller's current but arbitrarily selected clock frequency) divided by the estimated execution time at scaled frequency f:

$$S = \frac{T(f_n)}{T(f)}.$$

If the speedup is larger than one, this means that performance improves by rescaling to frequency f; if smaller than one, then performance decreases by rescaling to frequency f. If the goal is to improve performance (S>1), then it is profitable to upscale clock frequency to f (f>$f_n$) if the speedup S is larger than a given upper threshold (e.g., at least 1.05 or at least 5% performance improvement). If the goal is to preserve energy consumption, then it is profitable to downscale clock frequency to f (f<$f_n$) if the speedup is not exceeding a given bottom threshold (e.g., not below 0.95 or not more than 5% performance degradation). Choosing the values for upper and bottom thresholds (e.g., 1.05 for upscaling and 0.95 for downscaling) is up to the system engineer, depending on how much energy consumption one is willing to spend to improve performance (in case of upscaling), and how much performance degradation one is willing to sacrifice to reduce energy consumption (in case of downscaling).

The decision unit may be arranged for determining the DVFS profitability value by dividing the execution time for running the unit of work on the computing device at arbitrarily selected nominal frequency $f_n$ by the estimated execution time for running the unit of work on the computing device at the scaled frequency f.

In accordance with embodiments of the present invention, the computing unit may be adapted for counting the number of computing device clock cycles of the non-pipelined fraction due to off-chip memory accesses, and for determining the number of computing device clock cycles of the pipelined fraction from the total execution time and the counted number of cycles of the non-pipelined fraction. In accordance with alternative embodiments of the present invention, the computing unit may be adapted for counting the number of cycles of the pipelined fraction, and for determining the number of cycles of the non-pipelined fraction from the total execution time and the counted number of cycles of the pipelined fraction.

In a counter architecture according to embodiments of the present invention, the decision unit may be adapted for taking into account that the pipelined fraction scales proportionally with computing device clock frequency whereas the non-pipelined fraction does not scale with computing device frequency at all.

Estimating a DVFS profitability value may comprise determining an estimate for the execution time under DVFS. A method according to embodiments of the present invention may furthermore comprise using the estimated execution time under DVFS for estimating energy consumption.

According to an embodiment of the present invention, a counter architecture for estimating a profitability value of DVFS in a computing device may comprise:
  at least one counter for counting the number of off-chip cycles of a unit of work executed on the computing device;
  a first memory for storing an indication of whether an off-chip memory access is active; and
  a second memory for keeping track of which outstanding off-chip memory access initiated a burst of off-chip memory accesses.

According to embodiments of the present invention, the computing unit may be arranged for counting the number of cycles of the pipelined fraction of the total execution time, rather than the non-pipelined fraction, and for determining the number of cycles of the non-pipelined fraction from the total execution time and the counted number of cycles of the pipelined fraction. In such embodiments, the counter architecture may comprise a counter that is incremented every cycle of execution of a unit of work on the computing device, except when an off-chip memory access takes place. In case the computing device is a processor, the counter architecture may comprise a counter for determining the pipelined fraction, the counter being arranged for being incremented every processor clock cycle of execution of the unit of work on the processor, except when an instruction cache and/or instruction TLB miss accesses off-chip memory, and when a load/store cache or data TLB miss or I/O operation accesses off-chip memory if this load/store miss or TLB miss or I/O operation is the first in a burst of off-chip load/store cache and/or TLB misses and/or I/O operation.

According to embodiments of the present invention, a counter architecture is provided for estimating a profitability value of DVFS in a computing device being a processor, the counter architecture comprising at least one of:
  a first counter for counting the number of cycles that an instruction cache miss and/or an instruction Translation Lookaside Buffer (TLB) miss accesses off-chip memory; and
  a second counter for counting the number of cycles that a load/store cache miss and/or a TLB miss and/or I/O operation (collectively referred to as a memory access) accesses off-chip memory if this memory access is the first in a burst of off-chip load/store cache misses and/or TLB misses and/or I/O operations.

One implementation is to only have the first counter, which counts the number of cycles due to off-chip memory accesses due to the front-end misses (instruction cache and instruction TLB). Another implementation is to only have the second counter, which counts the number of cycles dies to off-chip memory accesses due to the back-end misses (load/store cache miss, TLB miss, I/O operation).

Yet another implementation is to have two physical counters, the first counter and the second counter, located at different places on the processor chip, one at the processor front-end (close to the instruction cache and TLB) and one at the processor back-end (close to the data cache where loads, stores and/or I/O operations are executed). At the end of a counting period, the values of these two counters are added. The sum of these counters is an estimate for the non-pipelined fraction of the total execution time. This may incur double-counting cycles during which memory accesses due to front-end misses (instruction cache misses and/or instruction TLB misses) overlap with back-end misses (load/store cache misses, data TLB misses and/or I/O operations).

Optionally, logic may be added. The logic may disable one counter while the second is counting and vice versa. As a result, the logic may avoid overlap between front-end miss penalties and back-end miss penalties and increase the accuracy of the estimation.

An alternative implementation is to physically implement both counters in a single counter unit. The first and the second counter may be the same counter, provided for both counting the front-end and back-end misses. This implementation avoids the double-counting problem of the front-end and back-end misses in a natural way.

A counter architecture according to embodiments of the present invention may furthermore comprise means for determining that the processor is blocked on the load/store misses or TLB misses or I/O operations.

A counter architecture for estimating a profitability value of DVFS in a processor according to embodiments of the present invention may furthermore comprise a first memory for storing an indication denoting whether a counter is actively counting, and a second memory for storing an indication denoting an entry for the first pending memory access in a burst of memory accesses.

According to alternative embodiments of the present invention, one could compute the pipelined fraction of the total execution time, rather than the non-pipelined fraction. In such embodiments, the counter architecture comprises a counter that is incremented every cycle of execution of a unit of work on the processor, except when an instruction cache or instruction TLB miss accesses off-chip memory, and a load/store cache or data TLB miss or I/O operation accesses off-chip memory if this load/store miss or data TLB miss or I/O operation is the first in a burst of off-chip load/store cache or data TLB misses or I/O operation. The resulting value from the counter then is the pipelined fraction of the total execution time. In such embodiments, the non-pipelined fraction is determined by subtracting the pipelined fraction from the total execution time.

According to a further inventive aspect of the present invention, a method is provided for estimating a profitability value for DVFS of a unit of work executed on a computing device. The method comprises dividing total execution time for the execution of the unit of work on the computing device into a pipelined fraction subject to clock frequency and a non-pipelined fraction due to off-chip memory accesses, and estimating a DVFS profitability value from these two fractions.

In a method according to embodiments of the present invention, estimating DVFS profitability value may take into account that the pipelined fraction scales proportionally with clock frequency whereas the non-pipelined fraction does not scale with frequency at all.

Estimating DVFS profitability value may comprise determining an estimate for the execution time under DVFS. A method according to embodiments of the present invention may furthermore comprise using the estimated execution time under DVFS for estimating energy consumption.

A method according to embodiments of the present invention may be for application in a processor. In such case, the non-pipelined fraction may be determined by counting the number of cycles that an instruction memory accesses off-chip memory, and the number of cycles that a load/store cache and/or data TLB miss and/or I/O operation accesses off-chip memory, if this load/store miss or data TLB miss or I/O operation is the first in a burst of off-chip load/store cache or TLB misses or I/O operations. The pipelined fraction may then be determined by subtracting the non-pipelined fraction from the total execution time.

Alternatively the pipelined fraction may be determined by counting every cycle of execution of the unit of work on the processor, except when an instruction cache and/or instruction TLB miss accesses off-chip memory, and when a load/store cache or data TLB miss or I/O operation accesses off-chip memory if this load/store miss or data TLB miss or I/O operation is the first in a burst of off-chip load/store cache and/or data TLB misses and/or I/O operations. The non-pipelined fraction may then be determined by subtracting the pipelined fraction from the total execution time.

In a method according to embodiments of the present invention, determining the non-pipelined fraction of the total execution time for executing a unit of work on a processor may comprise determining a first non-pipelined fraction of the total execution time due to off-chip instruction cache or instruction TLB misses, and determining a second non-pipelined fraction of the total execution time due to off-chip load/store misses, data TLB misses or I/O operations. Determining the first non-pipelined fraction of the total execution time due to off-chip instruction cache or instruction TLB misses may comprise computing a number of cycles the off-chip memory access takes, and dividing this number by the clock frequency. Determining the second non-pipelined fraction of the total execution time due to off-chip long-latency load/store misses or data TLB misses or I/O operations may comprise determining the access time for a first long-latency memory access in a burst of long-latency memory accesses.

The problem of how to accurately determine the pipelined and non-pipelined fraction of the total execution time is thus solved in accordance with embodiments of the present invention by a method and/or a corresponding hardware counter architecture to accurately estimate the profitability of Dynamic Voltage and Frequency Scaling (DVFS) in a computing device. The counter architecture estimates what the impact is of scaling clock frequency and optionally supply voltage on performance and energy consumption. Thereto, the total execution time of a unit of work executed on a computing device, e.g. the total execution time of a program executed on a processor, can be divided into a pipelined fraction subject to clock frequency and a non-pipelined fraction due to off-chip memory accesses. The counter architecture according to embodiments of the present invention estimates these two fractions, from which a DVFS profitability value can be estimated: the pipelined fraction scales proportionally with clock frequency (e.g., decreasing/increasing clock frequency by a factor of two, increases/reduces the pipelined fraction by a factor of 2) whereas the non-pipelined fraction does not scale at all; this yields an estimate for the execution time under DVFS, which in its turn may be used to estimate energy consumption. The counter architecture according to embodiments of the present invention is generally applicable across many types of computing devices, e.g. different processor types, for example going from embedded in-order processors to high-end out-of-order processors.

In embodiments of the present invention, the counter architecture according to embodiments of the present invention counts the number of cycles spent handling off-chip memory accesses (non-pipelined fraction) at an arbitrary (also called nominal in this document) clock frequency and supply voltage level; the pipelined fraction then is determined as the total number of execution cycles minus the non-pipelined fraction. A counter architecture according to embodiments of the present invention for use in a processor counts:

(1) the number of cycles that an off-chip instruction cache miss or Translation Lookaside Buffer (TLB) miss accesses memory—the counter architecture starts counting cycles when the request is sent to memory and stops counting when the request returns from memory; and (2) the number of cycles that an off-chip memory access (load/store miss, data TLB miss, and I/O operation) accesses memory and this memory access is the first in a burst of off-chip memory accesses. An additional requirement for stores over loads is that the store miss latency should be counted only if the processor is blocked on the store. The counter architecture uses an Active Counting (AC) bit that denotes whether the counter is actively counting, and a First Pending Miss (FPM) register which denotes an identifier (ID) for the first pending memory access in a burst of memory accesses; e.g., the ID kept track could be an identifier for a Miss Status Handling Register (MSHR) entry. Initially, the AC bit is set to a first binary value, e.g., zero. Upon a memory access, the AC bit is set to a second binary value different from the first binary value, e.g., one, an MSHR entry is allocated, the allocated MSHR entry ID is stored in the FPM register, and the counter starts counting (i.e., the counter is incremented every cycle). In the meanwhile, other requests may be issued, i.e., memory-level parallelism (MLP) may be exposed. When the first request (the one stored in the FPM register) returns from memory, the AC bit is reset to the first binary value, e.g., zero, the FPM content is cleared, and the counter stops counting. A counting epoch thus starts and stops with the first load miss in a burst of load misses, and can only start when the AC bit is set to the first binary value, e.g. zero.

In an alternative implementation of the present invention, in which the pipelined fractions are counted instead of the non-pipelined fraction, the counter for use in a processor is continuously incremented upon each cycle and should stop counting when (1) an off-chip instruction cache or instruction Translation Lookaside Buffer (TLB) miss accesses memory—the counter stops counting cycles when the memory access is initiated, and resumes counting when the memory access returns; or (2) an off-chip memory access due to a load/store miss, data TLB miss or I/O operation accesses memory, and this memory access is the first in a burst of off-chip memory accesses. The counter stops counting upon the first memory access in a burst of memory accesses, and resumes counting when the first memory access returns. (As before, an additional requirement for stores over loads is that the counter should not stop counting if the processor is not blocked on the store). The mechanism for determining whether a memory access is the first in a burst of memory accesses is the same as before, i.e., using the AC bit and the FPM register.

The counter architecture in accordance with embodiments of the current invention is more accurate than the method used in US 2008/0201591, and, when applied in conjunction with the teaching of this patent, may lead to an overall more effective system.

Employing the counter architecture according to embodiments of the present invention in the system as disclosed in US 2007/0168055 would allow for less run-time overhead, and thus better performance and larger energy reductions.

It is an advantage of embodiments of the present invention that the counter architecture according to embodiments of the present invention is substantially more accurate and/or incurs less overhead than the prior art approaches. More specifically, it is more accurate than proportional scaling and estimated linear scaling. In addition, it incurs less run-time overhead than linear scaling which requires (at least) two runs at different V/f operating points to determine the pipelined and non-pipelined fractions of the execution time; while the counter architecture according to embodiments of the present invention requires only one run at an arbitrary V/f operating point.

Applications

Computing device manufacturers in general, and processor manufacturers in particular can integrate the counter architecture according to embodiments of the present invention in their designs. The counter architecture according to embodiments of the present invention is generally applicable across many processor types, going from embedded in-order processors to high-end out-of-order processors.

The hardware cost for implementing the counter architecture according to embodiments of the present invention is very limited: in one embodiment it requires a counter to count the number of off-chip cycles; one bit that captures whether an off-chip memory access is active; and a few bits that keep track of which outstanding off-chip memory access initiated a burst of off-chip memory accesses. Assuming a 64-bit counter and 32 Miss Status Handling Registers (MSHRs or maximum number of outstanding off-chip memory accesses), the total hardware cost equals 64 (counter)+1 (active counting bit)+5 (MSHR identifier)=70 bits, plus an incrementer to increment the counter.

Various optimizations can benefit from the counter architecture according to embodiments of the present invention. The counter architecture according to embodiments of the present invention accurately estimates the performance, e.g., execution time and/or energy and energy-efficiency impact when scaling frequency and/or voltage. DVFS is a well-known and powerful technique for addressing a wide range of important problems in contemporary processors, including (but not limited to) reducing energy and power consumption (and thus increase energy-efficiency), increasing performance (at the cost of increased power consumption), addressing timing errors due to process variability, enabling dynamic thermal management, and dynamic lifetime reliability management.

These optimizations can be driven by the hardware as well as by software (both system software, such as the operating system or the hypervisor or virtual machine monitor, as well as application software).

Once the counter architecture according to embodiments of the present invention is available in hardware, software companies could be interested in exploiting this feature for various purposes as mentioned above (energy-efficiency, increasing performance, dealing with timing errors, dynamic thermal management, lifetime reliability management, etc.).

One use case is to employ the counter architecture to save energy consumption or improve performance. For example, a time-based scheme may count the pipelined and non-pipelined fractions during a time quantum (e.g., one million cycles), and by the end of the time quantum the counter architecture can then compute a profitability value for DVFS. For example, if the clock frequency can be scaled down while not hurting performance by more than a preset threshold (e.g., 2%), the scheme may scale down clock frequency during the next time quantum in order to save energy. Or, if scaling up clock frequency would yield a performance improvement by at least a preset threshold (e.g., 5%), the scheme may scale up frequency during the next time quantum, in order to improve performance.

An implementation in software rather than in hardware, e.g., a processor simulator in software, may enable running one simulation and predicting performance across a number of processor clock frequencies.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Figure 1:
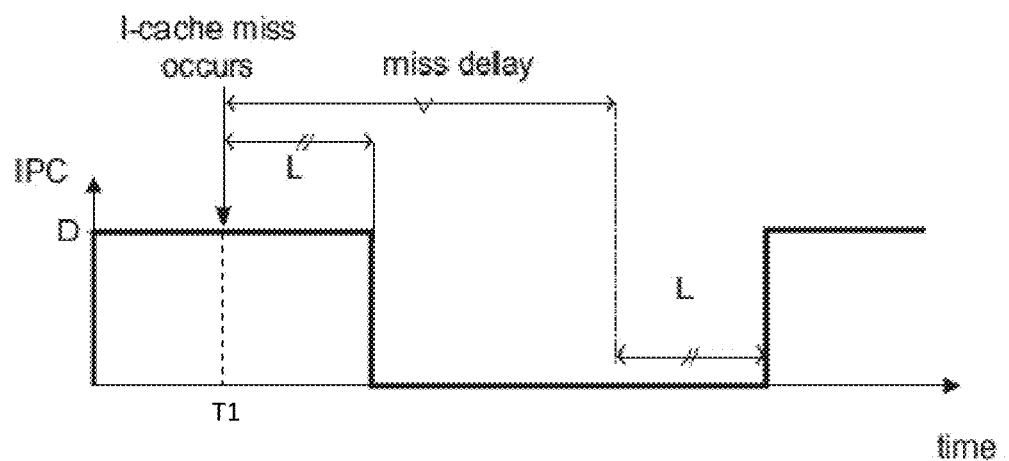
FIG. 1 illustrates off-chip I-cache miss timing (a) at frequency f, and (b) at frequency f'<f.
Figure 1:
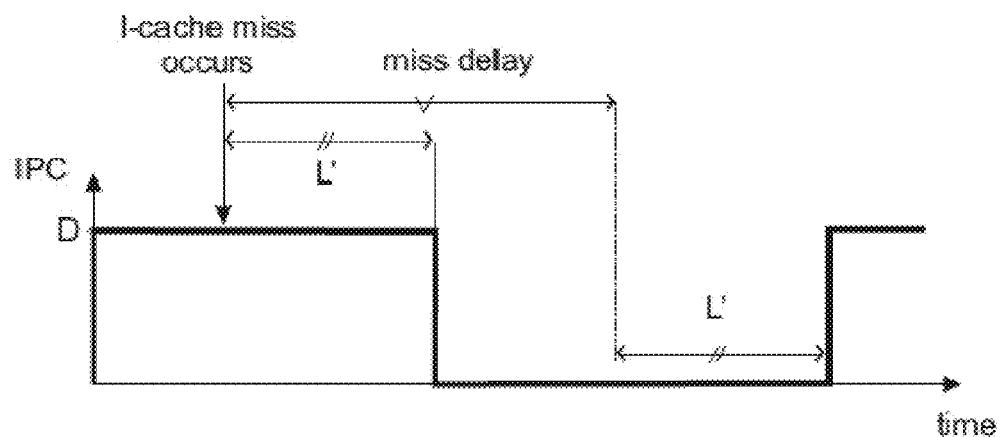

The drawings are only schematic and are non-limiting. In the drawings, the size of some of the elements or parts may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

A. Performance Model

The key idea behind a DVFS counter architecture according to embodiments of the present invention is to split up the total execution time into a pipelined fraction and a non-pipelined fraction. Total execution time T at the nominal clock frequency $f_n$ and supply voltage $V_n$ then equals $$T(V_n, f_n) = T_{pipelined}(V_n, f_n) + T_{non-pipelined}. \quad \text{Eq. (1)}$$

At voltage V and frequency f, the execution time can then be estimated as $\tilde{T}$:

$$\tilde{T}(V, f) = \frac{T_{pipelined}(V_n, f_n)}{f/f_n} + T_{non-pipelined}, \quad \text{Eq. (2)}$$

i.e., the pipelined fraction scales proportionally with clock frequency whereas the non-pipelined fraction does not.

A challenge now is to determine the pipelined and non-pipelined fractions of the total execution time.

In accordance with a first embodiment of the present invention, the non-pipelined fraction due to off-chip memory accesses is computed; the pipelined fraction then is the complement of the total execution time. In accordance with a second embodiment, the pipelined fraction is computed; the non-pipelined fraction then is the complement of the total execution time.

The findings in embodiments of the present invention are explained with reference to a DVFS counter architecture for estimating a profitability value for a unit of work running on the central processing unit of a computer system at an arbitrary processor clock frequency. However, this is not intended to be limiting. The counter architecture according to embodiments of the present invention can be implemented to any type of computing device where the total execution time of a unit of work running on the computing device can be divided in a pipelined and a non-pipelined fraction. By way of example, the computing device may, other than the processing unit of a computer system, be the central processing unit of a router or a server system. In yet an alternative embodiment, the computing device may be a memory controller of a computer system. The DVFS counter architecture according to embodiments of the present invention may then be arranged to determine at an arbitrary memory clock frequency a pipelined and a non-pipelined fraction of the total execution time of a unit of work running on the memory controller, resulting in a rescaling of the memory clock frequency rather than the processor clock frequency.

B1. Estimating the Non-Pipelined Fraction of the Total Execution Time of a Unit of Work Running on a Processor According to a First Embodiment of the Present Invention For estimating the non-pipelined fraction of the total execution time ($T_{non-pipelined}$) of a unit of work running on a processor, focus is laid, on the two major off-chip contributors to the total execution time, namely off-chip 1-cache misses and off-chip load misses. (TLB misses incur similar overheads, and are therefore treated collectively with off-chip cache misses.)

1) Off-chip I-cache misses: FIG. 1(a) shows a schematic drawing of the timing behavior for an off-chip (L2) I-cache miss. The vertical axis shows the processor's dispatch behavior as a function of time on the horizontal axis. Initially, the processor dispatches D instructions every cycle from the front-end pipeline into the reorder buffer and issue queues. At some point T1, an L2 I-cache miss occurs. Then it takes L cycles before dispatch stops, with L the number of front-end pipeline stages (i.e., the frontend pipeline depth from instruction fetch to dispatch). In the meanwhile the L2 I-cache miss is handled (through an off-chip memory access). When the off-chip memory access gets back (after elapsing of the miss delay), the processor will resume fetching instructions, and L cycles later, dispatch will resume. The penalty for an off-chip I-cache miss thus equals the off-chip memory access time, i.e., draining and filling the front-end pipeline offset each other.

In other words, the non-pipelined fraction of the total execution time due to an off-chip I-cache miss can be computed by counting the number of processor clock cycles the off-chip memory access takes divided by processor clock frequency.

2) Off-chip load misses: Off-chip (L2) D-cache load misses are more complicated, and a distinction is made between an isolated long-latency load miss and overlapping long-latency load misses. FIG. 2(a) shows the timing behavior for an isolated off-chip load miss. The L2 cache miss load instruction gets executed and the memory access gets initiated (see point 'A' in FIG. 2(a)).

Underneath the handling of the off-chip memory access, the processor will continue dispatching instructions during a time period 21 until either (i) the reorder buffer completely fills up and the long-latency load blocks the head of the reorder buffer, (ii) the issue queues fill up because of instructions that are dependent on the long-latency load, or (iii) the number of rename registers gets exhausted. Eventually, dispatch ceases at time T2 for a long period of time. When the data gets back from memory, dispatch resumes (see point 'B' in FIG. 2(a)).

Figure 2:
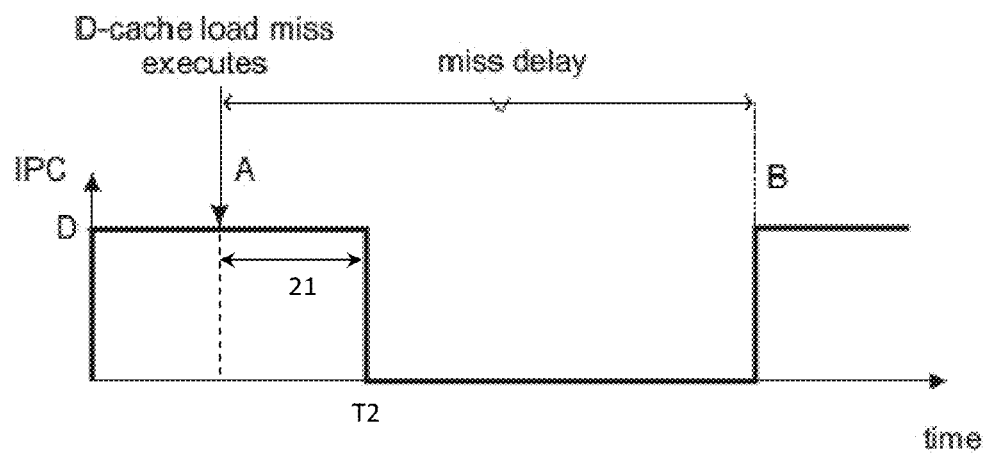
FIG. 2 illustrates timing of an isolated off-chip load miss (a) at frequency f, and (b) at frequency f'<f.
Figure 2:
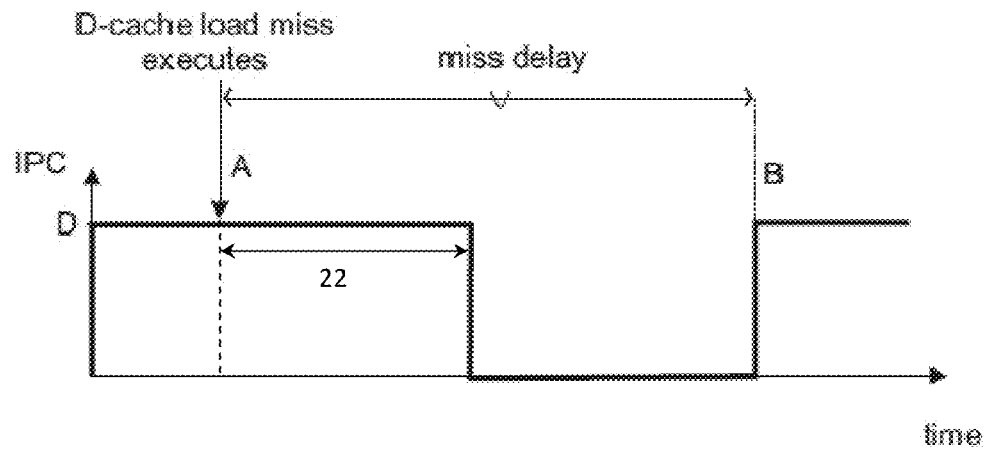

The time period where useful work gets done underneath the memory access scales when scaling processor frequency (compare time period 21 in FIG. 2(a) and time period 22 in FIG. 2(b)); however, it does not affect the non-pipelined fraction due to the memory access. The non-pipelined fraction of the execution time thus is the time between the long-latency load initiating its memory access (point 'A' in FIG. 2), and the data getting back from memory (point 'B').

Figure 3:
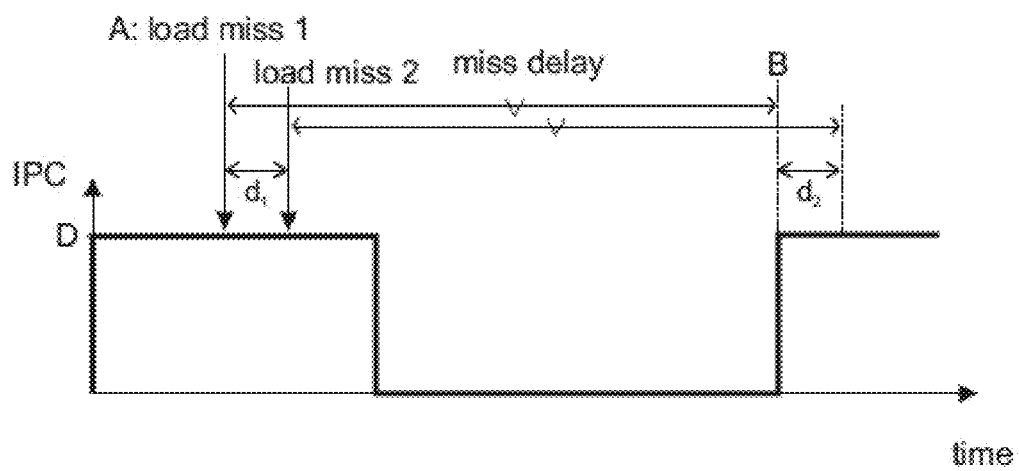
FIG. 3 illustrates timing of overlapping off-chip load misses (a) at frequency f, and (b) at frequency f'<f.
Figure 3:
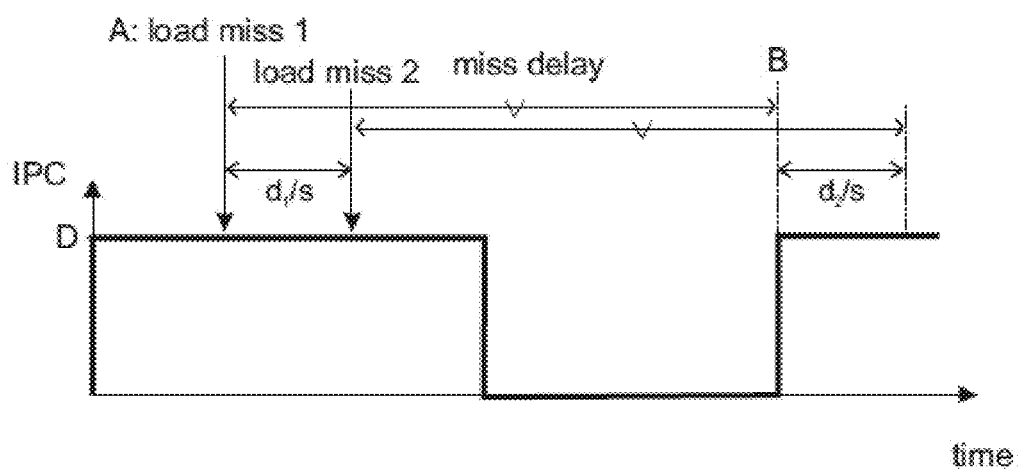

FIG. 3 shows the timing behavior for two independent long-latency load misses. At some point while the first long-latency load miss is being serviced, a second miss occurs. Both miss penalties overlap, i.e., memory-level parallelism (MLP) gets exposed. To derive the non-pipelined fraction of the execution time, assume now there are d1 and d2 time units between both memory accesses being initiated and returning from memory, respectively (see FIG. 3(a)). Scaling the processor clock frequency by a factor s (f'=s*f; s<1), these time deltas d1 and d2 will scale proportionally, i.e., the second memory access will be initiated d1/s time units past the first memory access, and the time delta between both memory accesses returning from memory will be d2/s time units (see FIG. 3(b)). The non-pipelined fraction of the execution time for two independent long-latency load misses thus is the time period between the first miss going to memory (point 'A') and the first miss returning from memory (point 'B'); the time period between the two misses going to memory (i.e., d1) gets hidden under the non-pipelined miss delay, and the time period between the first miss and second returning from memory i.e., d2) is pipelined.

This observation generalizes to an arbitrary number of independent long-latency loads. Thus, the non-pipelined fraction of the execution time due to long-latency load misses is the memory access time for the first long-latency load miss in a burst of long-latency load misses.

B2. Estimating the Pipelined Fraction of the Total Execution Time of a Unit of Work Running on a Processor According to a Second Embodiment of the Present Invention In the second embodiment of the present invention, contrary to the first implementation, the pipelined fraction of the total execution time ($T_{pipelined}$) of a unit of work running on a processor is counted instead of the non-pipelined fraction. In this embodiment, the counter is continuously incremented upon each processor clock cycle and stops counting when (1) an off-chip instruction cache and/or Translation Lookaside Buffer (TLB) miss accesses memory—the counter stops counting cycles when the memory access is initiated, and resumes counting when the memory access returns; or (2) an off-chip memory access (load/store miss, data TLB miss or I/O operation) accesses memory and this memory access is the first in a burst of off-chip memory accesses. The counter stops counting upon the first memory access in a burst of memory accesses, and resumes counting when the first memory access returns. As before, an additional requirement for stores over loads is that the counter should not stop counting if the processor is not blocked on the store. The mechanism for determining whether a memory access is the first in a burst of memory accesses is the same as before, i.e., using the AC bit and the FPM register.

C. A Practical Counter Architecture According to a First Embodiment of the Present Invention Based on these insights, a counter architecture is proposed that counts the number of cycles that an off-chip I-cache miss or instruction TLB miss accesses memory, and the number of cycles that an off-chip load miss accesses memory and this load miss is the first in a burst of load misses. To do so, the counter architecture, in accordance with embodiments of the present invention, uses an Active Counting (AC) bit that denotes whether the counter is actively counting, and a First Pending Miss (FPM) register which denotes the ID of the Miss Status Handling Register (MSHR) entry for the first pending miss in a burst of misses. Initially; the AC bit is set to zero. Upon a load miss, the AC bit is set, an MSHR entry is allocated, the allocated MSHR entry ID is stored in the FPM register, and the counter starts counting. In the meanwhile, other requests may be issued, i.e., MLP is exposed. When the first request (the one stored in the FPM register) returns from memory, the AC bit is reset, the FPM content is cleared, and the counter stops counting. A counting epoch thus starts and stops with the first load miss in a burst of load misses, and can only start when the AC bit is zero.

The counter architecture does not double-count processor clock cycles where an off-chip I-cache miss is overlapped by off-chip load misses, and vice versa.

The hardware cost for the counter architecture according to embodiments of the present invention is small. It only requires a counter and an associated incrementer for counting the number of off-chip cycles, an AC bit, and an FPM register (requiring $\lceil \log_2(N_{MSHR}) \rceil$ bits with $N_{MSHR}$ the number of MSHR entries). The total hardware cost is limited to 70 bits (assuming 32 MSHRs) plus a 64-bit incrementer.

It is to be noted that the counter architecture captures variable memory access latencies naturally, i.e., it does not approximate off-chip memory access latencies by constants but instead actually counts the number of off-chip memory access cycles. This enables computing variable memory access latencies due to for example open page hits and misses, memory bank conflicts, memory reference reordering by the memory controller, etc. In addition, it also applies to remote cache accesses in multiprocessor and/or multicore processor architectures due to coherence actions.

D. Estimating Energy Consumption

A distinction is made between a fully clock gated processor versus a processor without clock gating for estimating the impact of DVFS on energy consumption. One can derive the formula for a microprocessor with partial clock gating by making a distinction between the parts of the processor that are fully clock gated versus the parts that are not. In what follows, it is assumed that the processor features the capability for online measuring the (total) energy consumption $E(V_n, f_n)$ and execution time $T(V_n, f_n)$ at a nominal processor clock frequency $f_n$ and supply voltage $V_n$. Execution time can be measured using hardware performance counters that are typically available on modern microprocessors.

Energy consumption can be estimated online for example using the techniques as described by C. Isci and M. Martonosi in "Runtime power monitoring in high-end processors: Methodology and empirical data" in Proceedings of the 36th Annual International Symposium on Microarchitecture (MICRO), pages 93-104, December 2003, and is implemented in the Intel Foxton technology as described by R. McGowen et al. in "Power and temperature control on a 90-nm Itanium family processor", IEEE Journal of Solid-State Circuits, 41(1):229-237, January 2006. It is also assumed that the static power consumption of the microprocessor $P_s(V)$ is known. Static power consumption can be considered as a relatively slowly varying constant and could be measured periodically by halting the processor for a period of time and measuring its power consumption in halted state—power consumption during halting approximates static power consumption.

1) Without clock gating: In a non-clock-gated processor, the processor consumes dynamic and static power during its entire operation. Energy consumption at processor clock frequency f and supply voltage V can thus be estimated as $$\breve{E}(V, f) = \left(\frac{E_d(V_n, f_n)}{T(V_n, f_n)} \cdot \frac{V^2 f}{V_n^2 f_n} + P_s(V)\right) \cdot \breve{T}(V, f) \qquad \text{Eq. (3)}$$

with $\breve{T}(V, f)$ the estimated execution time at processor clock frequency f and supply voltage V. The first term between brackets in the above equation (3) estimates dynamic power consumption whereas the second term estimates static power consumption.

The nominal dynamic energy consumption in the above formula can be computed as $$E_d(V_n, f_n) = E(V_n, f_n) - P_s(V_n) T(V_n, f_n), \qquad \text{Eq. (4)}$$

i.e., the total energy consumption minus the static energy consumption at the nominal V/f operating point.

2) With clock gating: In a clock-gated processor, energy consumption can be estimated as $$\breve{E}(V, f) = E_d(V_n, f_n) \cdot \frac{V^2}{V_n^2} + P_s(V) \cdot \breve{T}(V, f) \qquad \text{Eq. (5)}$$

The first and second term estimate dynamic and static energy consumption, respectively. The static energy consumption term is easy to understand: static power is consumed during the entire (estimated) execution time $\breve{T}(V, f)$. The dynamic energy consumption term is slightly more complicated: the intuition is that a clock-gated processor only consumes dynamic power when there is work to be done, and the fraction of time where work is done scales proportionally with processor frequency under DVFS. In other words, if the processor consumes dynamic power for U time units at the nominal $V_n/f_n$ operating point, the processor will consume dynamic power for $U \cdot f_n/f$ time units at a V/f operating point. Dynamic power consumption is a factor $V^2 f/V_n^2 f_n$ of the nominal dynamic power consumption. Hence, the dynamic energy consumption at the V/f operating point under clock gating equals $$E_d(V_n, f_n) \cdot \frac{U \cdot f_n/f}{u} \cdot \frac{V^2 f}{V_n^2 f_n} = E_d(V_n, f_n) \cdot \frac{V^2}{V_n^2}.$$

E. Assumptions

The counter architecture according to embodiments of the present invention may make a number of simplifying assumptions in order to limit the design complexity of the counter architecture with limited impact on accuracy.

First, the performance model may assume that the amount of work done underneath a non-pipelined memory access does not exceed the memory access time when scaling processor clock frequency. This is a reasonable assumption because memory access time is typically in the order of several hundreds of processor cycles whereas the amount of work done by the processor underneath a memory access typically takes no longer than a few tens of processor clock cycles. In order words, frequency can be scaled by one order of magnitude without violating this assumption.

Second, the performance model may assume that the non-pipelined fraction of the total execution time does not change with scaling processor clock frequency. This may not always be a valid assumption because of (slightly) different bus contention patterns and memory access reorderings due to the different points in time at which off-chip memory requests are being submitted by the processor. This assumption, however, is believed reasonable in practice though, especially for First-Come-First-Served-based bus and memory controllers.

Third, off-chip store misses may also incur an additional contribution to the non-pipelined fraction of the total execution time. This may occur when retirement blocks on a store miss at the head of a full store buffer and dispatch blocks because of a full reorder buffer, issue queue, etc. and the store miss does not overlap with other off-chip memory accesses. This only occurs on rare occasions though for most workloads, which is why a counter architecture according to embodiments of the present invention may simply ignore off-chip store misses.

Finally, for the energy predictions, it may be assumed that the effective capacitance does not change when scaling processor clock frequency. Or, in other words, it may be assumed that the per-cycle device activity level remains constant across a range of clock frequencies, which has been found to be a reasonable assumption.

Experimental Setup

In experiments, the SPEC CPU2000 benchmarks have been used; the binaries are highly optimized Alpha binaries (taken from the SimpleScalar website). To limit the simulation time in the experiments performed, representative 100M-instruction simulation points as provided by SimPoint and as described by T. Sherwood et al. in "Automatically characterizing large scale program behavior" in Proceedings of the International Conference on Architectural Support for Programming Languages and Operating Systems (ASPLOS), pages 45-57, October 2002 have been used. SimPoint selects simulation points based on code signatures, which capture program behavior in a hardware-independent way. As such, the simulation points can be used across different V/f settings. The SimpleScalar/Alpha v3.0 out-of-order simulator has been used for all of the experiments. A contemporary 4-wide superscalar out-of-order processor configuration has been assumed, see Table I.

TABLE I

| | |
| --- | --- |
| ROB | 128 entries |
| LSQ | 64 entries |
| processor width | decode, dispatch, issue and commit 4 wide fetch 8 wide |
| latencies | load (2), mul (3), div (20) |
| L1 I-cache | 32 KB 4-way set-assoc, 1 cycle |
| L1 D-cache | 32 KB 4-way set-assoc, 1 cycle |
| L2 cache | unified, 2 MB 8-way set-assoc, 9 cycles |
| main memory | 250 cycle access time |
| branch predictor | hybrid bimodal/gshare predictor |
| frontend pipeline | 5 stages |

The dynamic power model is taken from Wattch v1.02 as described by D. Brooks et al. in "A framework for architectural-level power analysis and optimizations", in Proceedings of the 27$^{th}$ Annual International Symposium on Computer Architecture (ISCA), pages 83-94, June 2000. Two power modes are considered: (i) cc0 which assumes that all processor structures consume dynamic power every processor clock cycle, i.e., there is no clock gating, and (ii) cc1 which assumes that unused processor structures consume no dynamic power consumption, i.e., they are clock gated. The static power model is taken from HotLeakage as described by Y. Zhang et al. "A temperature-aware model of subthreshold and gate leakage for architects", Technical report, University of Virginia, March 2003. HotLeakage models subthreshold and gate leakage. Further, a 70 nm CMOS chip technology is assumed, a nominal $V_{dd,n}=1V$ supply voltage and $f_n=3.6$ GHz processor clock frequency. The other V/f settings are shown in Table II.

TABLE II

| f | V |
|---|---|
| 3.6 GHz | 1 V |
| 2.7 GHz | 0.88 V |
| 1.8 GHz | 0.76 V |
| 0.9 GHz | 0.64 V |

Evaluation

A counter architecture according to embodiments of the present invention is now evaluated. Each benchmark is first run at the nominal $V_n/f_n$ operating point, and the counter architecture measures the pipelined and non-pipelined fractions of the total execution time. The execution time at another V/f operating point is then estimated using Eq. (2); energy consumption is estimated using Eq. (3) and Eq. (5) for a non-clock-gated and clock-gated processor, respectively. These estimates are then compared against measurements through benchmark simulation at the V/f operating points. A similar approach is taken for the other DVFS profitability estimation techniques. Employing DVFS profitability estimation in practice may require profiling the execution during the current interval to predict the next one within a single benchmark run. Because this is the case for all DVFS profitability estimation techniques, a multiple run setup is considered and focus is laid on evaluating the intrinsic accuracy of the counter architecture according to embodiments of the present invention.

A. Execution Time

Figure 4:
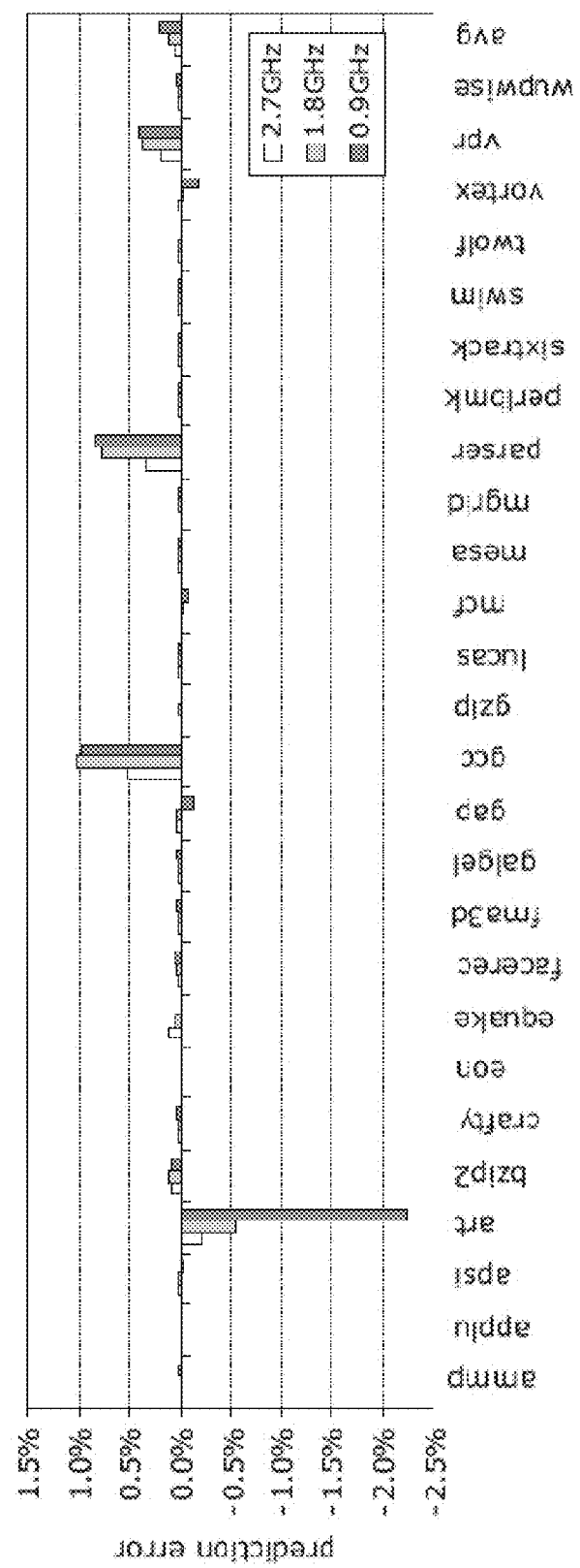
FIG. 4 illustrates prediction error for predicting execution time at three V/f operating points based on a run at the nominal 3.6 GHz operating point.

FIG. 4 shows the prediction error for the counter architecture for predicting execution time for each of the SPEC CPU2000 benchmarks at the 2.7 GHz, 1.8 GHz and 0.9 GHz operating points based on a run at the nominal 3.6 GHz operating point. The errors are small and increase with operating points further away from the nominal operating point. The average (absolute) error is 0.2% and the maximum error is 2.2% at the 0.9 GHz operating point for art. The underestimation for art is due to a second-order effect: front-end miss events (e.g., branch mispredictions and L1 I-cache misses) between two independent load misses increase the time between the independent load misses going to memory at low clock frequencies, and as a result the processor may stall on the second load miss which is not the case at higher clock frequencies. This appears to be a minor effect only though.

Figure 5:
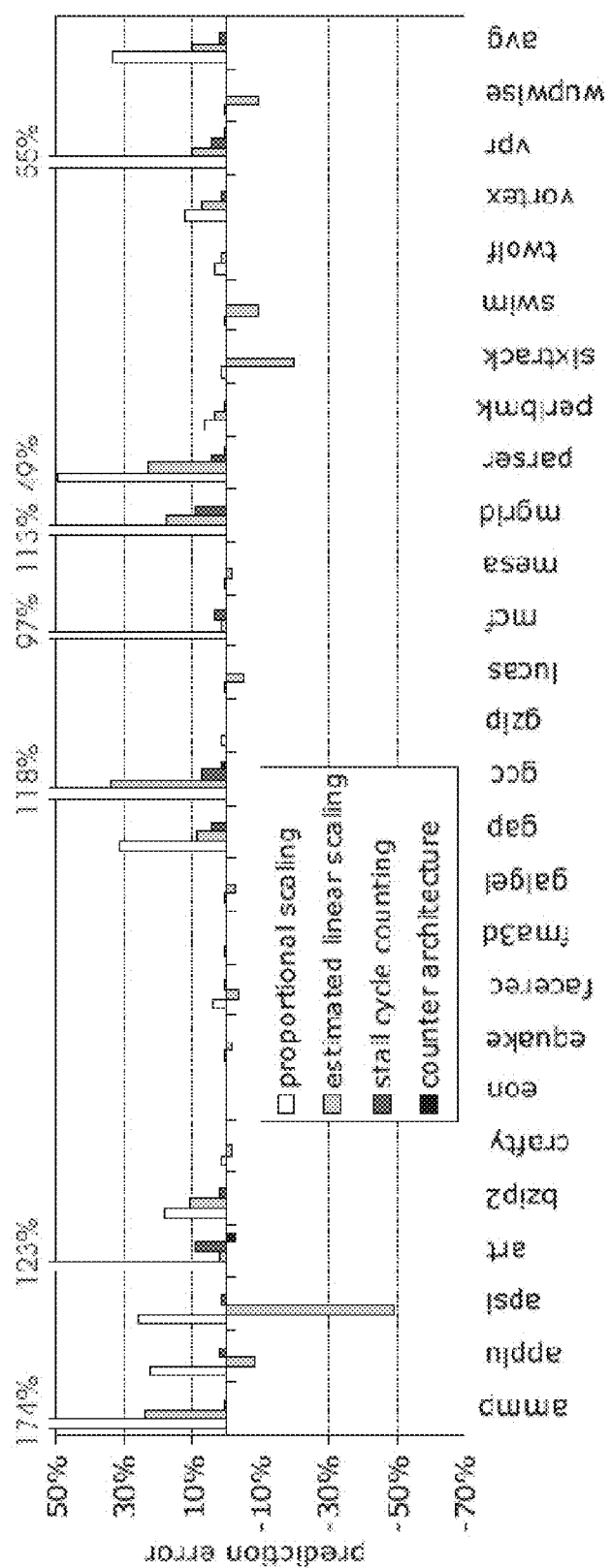
FIG. 5 illustrates prediction error for predicting execution time at the 0.9 GHz operating point for proportional scaling, estimated linear scaling, stall cycle counting, all according to the prior art, and for the counter architecture according to embodiments of the present invention.

B. Comparison to Proportional Scaling, Estimated Linear Scaling and Stall Cycle Counting The counter architecture according to embodiments of the present invention is substantially more accurate than proportional scaling, estimated linear scaling, and stall cycle counting, as illustrated in FIG. 5. Proportional scaling is accurate for compute-bound applications; however, it incurs large errors for memory-bound and compound compute/memory-intensive applications: the average error equals 33% and goes up to 174% at the 0.9 GHz operating point.

Estimated linear scaling learns the relationship between performance and clock frequency by building an empirical model that correlates performance with the number of last-level cache misses (or off-chip memory accesses). The empirical model considered here is a linear regression model similar to the work presented by K. Choi et al. in "Fine-grained dynamic voltage and frequency scaling for precise energy and performance trade-off based on the ratio of off-chip access to on-chip computation times.", Proceedings of the Symposium on Design Automation and Test in Europe (DATE), pages 10004-10009, April 2004: the independent variable is the number of cache misses per instruction and the dependent variable is the (estimated) execution time. Estimated linear scaling is more accurate than proportional scaling with an average error of 9.8%. However, for several benchmarks, estimated linear scaling incurs errors larger 20% and up to 50%. The reason for this high inaccuracy is that estimated linear scaling does not accurately account for memory-level parallelism by treating multiple time-overlapping off-chip memory accesses as individual time-separated memory accesses. This problem is overcome with a counter architecture according to embodiments of the present invention, where a direct time estimate of the time spent when handling off-chip memory accesses is provided.

Stall cycle counting estimates the non-pipelined fraction of the execution time as the time during which no instructions are dispatched. Stall cycle counting is fairly accurate in estimating execution time with an average error of 2% and errors of at most 9.5%. However, it does not accurately account for the amount of work that gets done underneath the off-chip load miss penalty and thus underestimates the non-pipelined penalty for off-chip load misses. The counter architecture according to embodiments of the present invention is more accurate (average error of 0.2% and max error of 2.2%) at a minor additional hardware cost (6 more bits compared to stall cycle counting).

C. Energy Consumption

Figure 6:
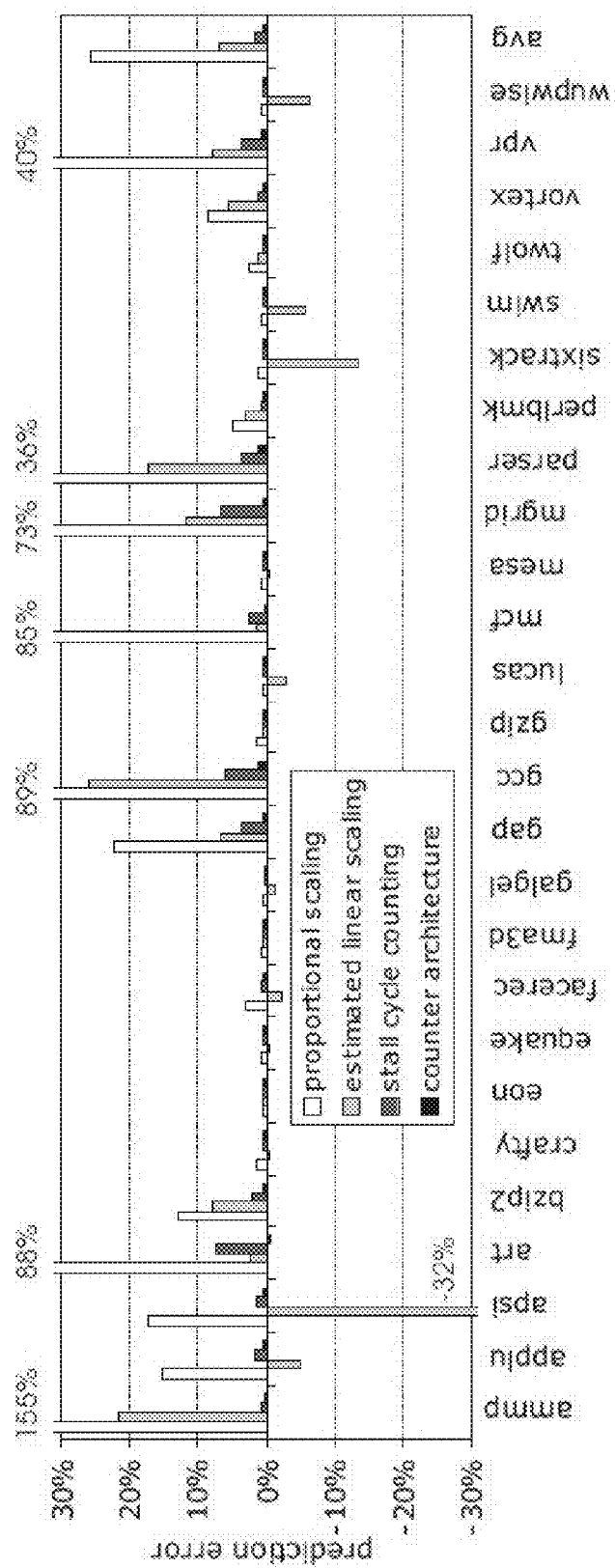
FIG. 6 illustrates prediction error for predicting energy consumption at the 0.9 GHz operating point for proportional scaling, estimated linear scaling, stall cycle counting, all according to the prior art, and for the counter architecture according to embodiments of the present invention, assuming a clock-gated microprocessor.

FIG. 6 shows the error in predicting energy consumption assuming a clock-gated microprocessor. The errors are small with an average error around 0.5% and a max error of 1.2%. For a non-clock-gated processor, the errors are comparable: a 0.7% average error and a 1.7% maximum error for art. The counter architecture according to embodiments of the present invention is more accurate than estimated linear scaling which incurs an average error of 7.1% and up to 31.8% for a clock-gated processor, and an average error of 10% and up to 50% for a non-clock-gated processor. Proportional scaling is even more inaccurate. Although it may be accurate over small ranges of V/f settings, it is highly inaccurate across larger ranges. It has been found by the present inventors to generate an average prediction error of 155% and 176% for a clock-gated and non-clock-gated processor, respectively, at the 0.9 GHz operating point. Stall cycle counting is relatively accurate compared to proportional scaling and estimated linear scaling (average error of 1.8% and max error of 7.4% for the clock-gated processor, and 2.5% average error and 10.1% max error for the non-clock-gated processor); however, it is less accurate than the counter architecture according to embodiments of the present invention.

D. Energy-Efficiency

Figure 7:
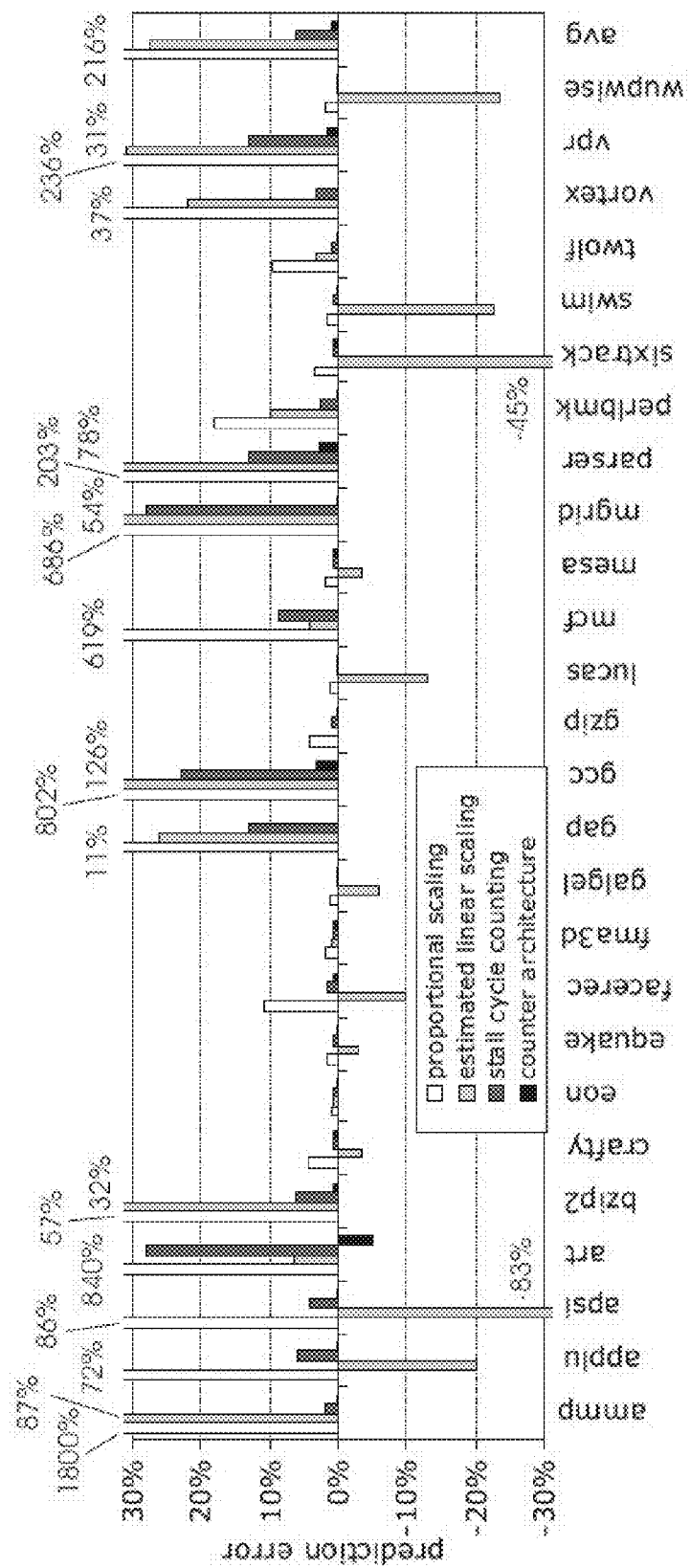
FIG. 7 illustrates prediction error for predicting $ED^2P$ at the 0.9 GHz operating point for proportional scaling, estimated linear scaling, stall cycle counting, all according to the prior art, and for the counter architecture according to embodiments of the present invention, assuming a clock-gated microprocessor.

The EDP and $ED^2P$ metrics are well-known metrics to quantify the energy-efficiency of a microprocessor; EDP and $ED^2P$ quantify the energy consumed per unit of performance and are lower-is-better metrics. FIG. 7 quantifies the error in predicting $ED^2P$ at the 0.9 GHz operating point for proportional scaling, estimated linear scaling, stall cycle counting and the counter architecture according to embodiments of the present invention, assuming a clock-gated processor. Similar results are obtained for EDP and a non-clock-gated processor. The errors for estimating EDP and ED²P are higher than for estimating energy and execution time, because EDP and ED²P are composed metrics, i.e., the energy and performance prediction errors magnify each other in the combined energy-efficiency metric. Proportional scaling and estimated linear scaling clearly fall short with average errors of 216% and 27%, respectively. Stall cycle counting is more accurate with an average error of 6.1% and max errors up to 28%. The counter architecture according to embodiments of the present invention is even more accurate with an average error of 0.8% and at most 5% (art).

Application: Multi-Core DVFS Power Management

An important objective in multi-core processors is to maximize system performance while staying within a predetermined power and temperature budget. Commercial server processors such as the Intel Itanium Montecito processor described by R. McGowen et al. in "Power and temperature control on a 90-nm Itanium family processor", IEEE Journal of Solid-State Circuits, 41(1):229-237, January 2006 feature on-chip circuitry for this purpose: if power consumption is less than its budget, voltage and frequency are scaled up, and if power consumption exceeds its budget, voltage and frequency are scaled down. Similarly, the AMD Opteron Quad-Core processor as described by J. Dorsey et al. in "An integrated quad-core Opteron processor", Proceedings of the International Solid State Circuits Conference (ISSCC), pages 102-103, February 2007 employs core-level frequency scaling to maximize performance within a given power budget.

The counter architecture according to embodiments of the present invention could be a valuable instrument towards core-level DVFS scheduling in a multi-core processor (which may become an important technology for addressing processor variability issues in future multi-core processors). Isci et al. in "An analysis of efficient multi-core global power management policies: Maximizing performance for a given power budget", Proceedings of the International Symposium on Microarchitecture (MICRO), pages 347-358, December 2006, propose a core-level DVFS policy: they adjust per-core clock frequency and supply voltage to maximize system throughput while not exceeding the maximum chip-level power budget. They assume proportional scaling which they found to be accurate within 4% for general-purpose applications while scaling frequency over at most 15% of its nominal operating point. When scaling frequency over larger ranges, proportional scaling falls short while the counter architecture according to embodiments of the present invention yields more accurate performance and energy projections, as shown above. It has now been demonstrated that this leads to much better per-core DVFS schedules in a multi-core processor.

The input to the setup is the power consumption and execution time at the nominal $V_n/f_n$ operating point for each benchmark. The power consumption and execution time are then estimated at the other V/f operating points through (i) proportional scaling, (ii) estimated linear scaling, (iii) stall cycle counting, and (iv) the counter architecture in accordance with embodiments of the present invention. Also the power consumption and execution time are computed through simulation at each V/f operating point for comparison. A clock-gated processor is assumed in these experiments. Then 20 randomly chosen 4-benchmark combinations are considered assuming that each benchmark runs on a separate core of a 4-core CMP, and the best possible per-core V/f settings are determined that maximize system throughput for a given power budget. The power budget is set to 30 W, and performance is quantified in terms of system throughput (STP) and average normalized turnaround time (ANTT). STP and ANTT quantify the performance of a multiprogram environment in terms of both system-perceived and user-perceived performance, respectively.

Figure 8:
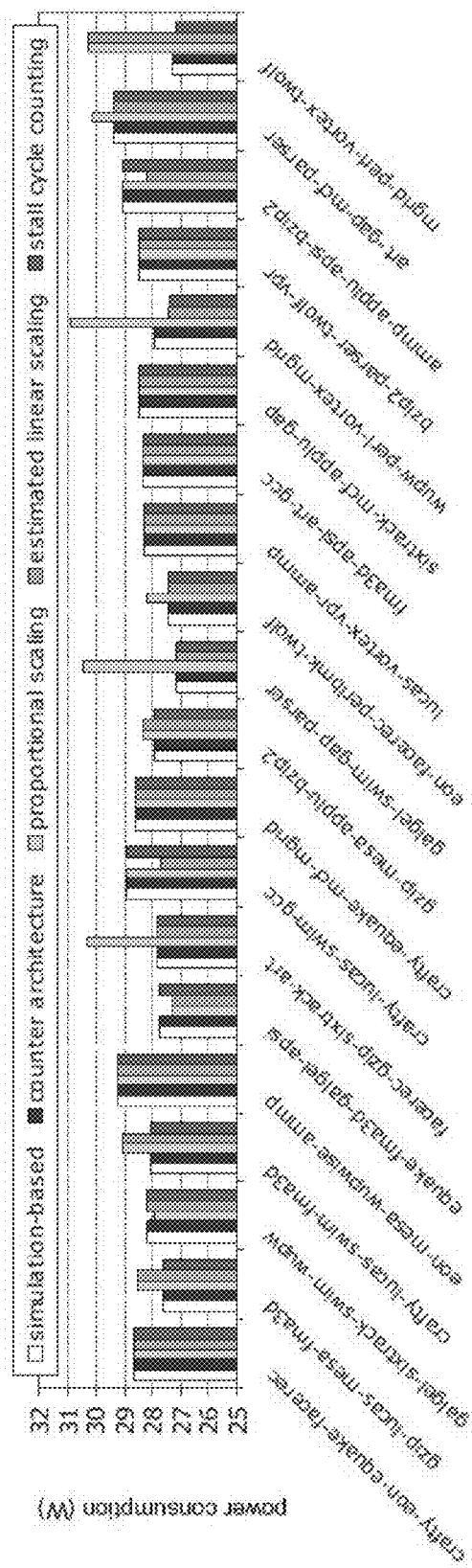
FIG. 8, FIG. 9 and FIG. 10 illustrate results of a counter architecture according to embodiments of the present invention for power consumption, system throughput and average normalized turnaround time on a chip-multiprocessor (CMP) or multicore processor, respectively.
Figure 9:
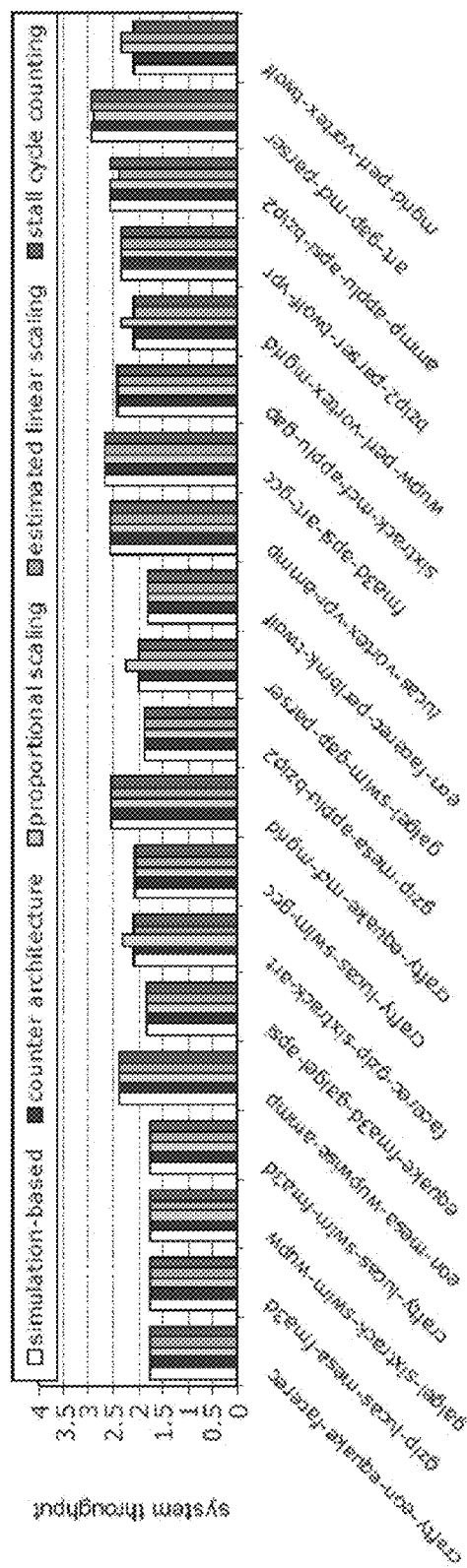
Figure 10:
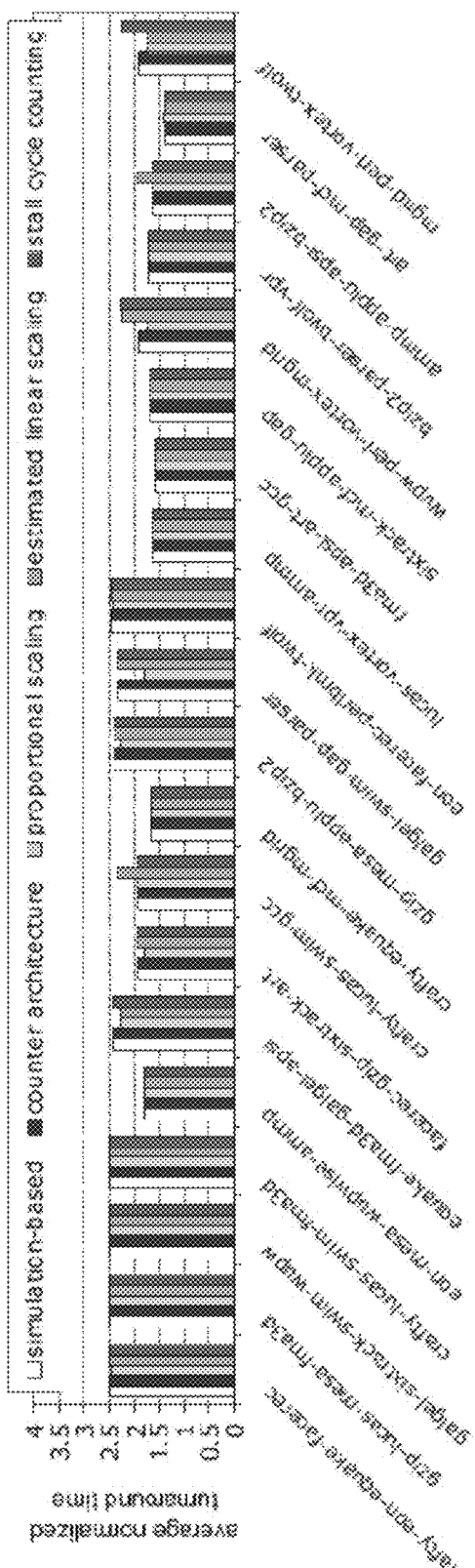

Results of testing a counter architecture in accordance with embodiments of the present invention in terms of power consumption, system throughput and average normalized turnaround time, respectively, are illustrated in FIG. 8, FIG. 9 and FIG. 10 and report that the counter architecture Closely tracks ideal simulation-based DVFS scheduling and does not cause power budget overshoots for any of the workloads. Proportional scaling on the other hand results in a power budget overshoot for 4 out of 20 workloads, and this power overshoot goes up to 12.2% above the power consumption by the counter architecture according to embodiments of the present invention. Estimated linear scaling also leads to a power overshoot for a single workload, leading to 10.9% more power consumption than the counter architecture according to embodiments of the present invention. For the other workloads for which none of the approaches leads to a power budget overshoot, the counter architecture according to embodiments of the present invention achieves similar or significantly higher performance. Compared to estimated linear scaling, the counter architecture according to embodiments of the present invention leads to up to 8% higher system throughput and up to 17% shorter job turnaround time. Compared to stall cycle counting, the counter architecture according to embodiments of the present invention leads to an up to 15% shorter job turnaround time. In summary, the DVFS counter architecture according to embodiments of the present invention leads to higher system throughput and shorter job turnaround time while not exceeding the target power budget.

The invention claimed is:

1. A counter architecture for estimating a profitability value of dynamic voltage and frequency scaling (DVFS) for a unit of work running on a computing device, the counter architecture comprising:
   a computing unit configured to determine from a total execution time for executing the unit of work on the computing device at arbitrary frequency a pipelined fraction and a non-pipelined fraction due to off-chip memory accesses, and
   a decision unit that estimates the DVFS profitability value from these two fractions, wherein the computing unit and decision unit comprise hardware.

2. The counter architecture according to claim 1, wherein the computing unit is arranged to count a number of cycles of the non-pipelined fraction due to off-chip memory accesses, and to determine a number of cycles of the pipelined fraction from the total execution time and the counted number of cycles of the non-pipelined fraction.

3. The counter architecture according to claim 1, comprising:
   at least one counter that counts a number of off-chip cycles of a unit of work running on a computing device;
   a first memory storing an indication of whether an off-chip memory access is active; and
   a second memory configured to keep track of which outstanding off-chip memory access initiated a burst of off-chip memory accesses.

4. The counter architecture according to claim 1, wherein the computing unit is arranged to count a number of cycles of the pipelined fraction, and to determine a number of cycles of the non-pipelined fraction from the total execution time and the counted number of cycles of the pipelined fraction.

5. The counter architecture according to claim 4, wherein the computing device comprises a processor and wherein the counter architecture furthermore comprises a counter that determines the pipelined fraction, the counter being arranged to be incremented every processor clock cycle of execution of the unit of work on the processor, except when an instruction cache and/or instruction translation lookaside buffer (TLB) miss accesses off-chip memory, and when a load/store cache or data TLB miss or input/output (I/O) operation accesses off-chip memory if this load/store miss or TLB miss or I/O operation is the first in a burst of off-chip load/store cache and/or TLB misses and/or I/O operation.

6. The counter architecture according to claim 1, wherein the computing device is a processor and wherein the counter architecture comprises at least one of:
 a first counter that counts a number of processor clock cycles that an instruction cache miss and/or instruction Translation Lookaside Buffer (TLB) miss accesses off-chip memory; and
 a second counter that counts a number of processor clock cycles that a load/store cache and/or TLB miss and/or I/O operation accesses off-chip memory if this memory access is the first in a burst of off-chip load/store cache misses and/or TLB misses and/or I/O operations.

7. The counter architecture according to claim 6, furthermore comprising
 a first memory that stores an indication denoting whether the second counter is actively counting, and
 a second memory that stores an indication denoting an entry for a first pending memory access in a burst of memory accesses.

8. A method for estimating a DVFS profitability for a unit of work running on a computing device, the method comprising:
 dividing total execution time for executing the unit of work on the computing device into a pipelined fraction subject to clock frequency and a non-pipelined fraction due to off-chip memory accesses, and
 estimating a DVFS profitability value based on the pipelined fraction and the non-pipelined fraction.

9. The method according to claim 8, the method furthermore comprising determining the non-pipelined fraction by counting a number of cycles that an instruction cache miss and/or an instruction TLB miss accesses off-chip memory, and a number of cycles that a load/store cache miss and/or data TLB miss and/or I/O operation accesses off-chip memory, if this load/store miss or data TLB miss or I/O operation is the first in a burst of off-chip load/store cache and/or TLB misses and/or I/O operations.

10. The method according to claim 8, comprising determining the pipelined fraction by subtracting the non-pipelined fraction from the total execution time.

11. The method according to claim 8 the method furthermore comprising determining the pipelined fraction by counting every cycle, except when an instruction cache and/or TLB miss accesses off-chip memory, and a load/store cache and/or TLB miss accesses off-chip memory if this load/store miss is the first in a burst of off-chip load/store cache and/or TLB misses.

12. The method according to claim 8, furthermore comprising determining the non-pipelined fraction by subtracting the pipelined fraction from the total execution time.

13. The method according to claim 8, furthermore comprising estimating energy consumption based on an estimated execution time.

* * * * *